Dec. 24, 1940.  F. J STEVERMER  2,225,805
FISHING LINE SINKER
Filed Nov. 6, 1939
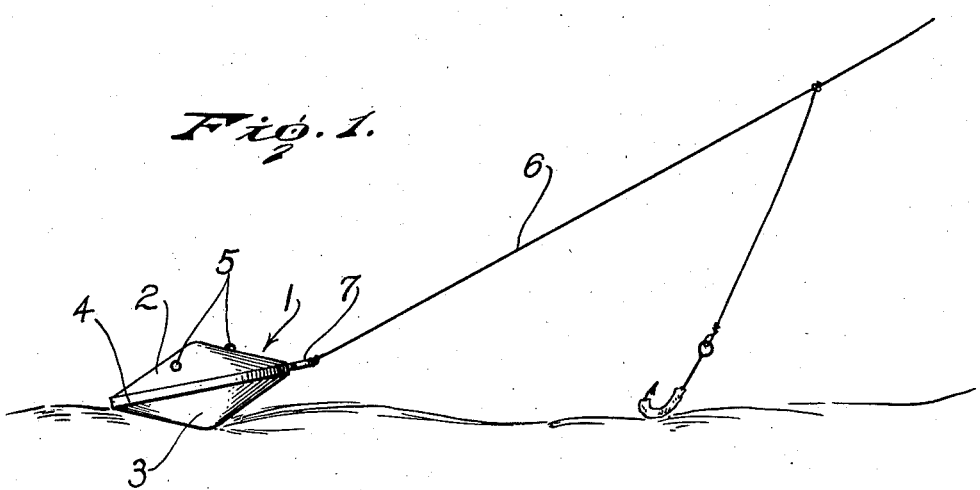
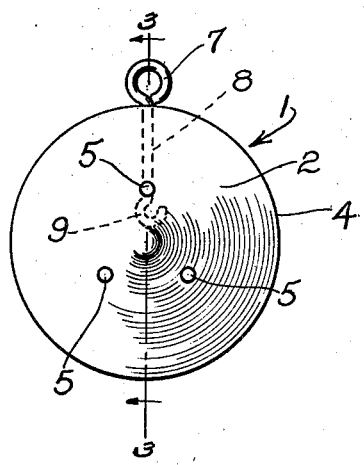
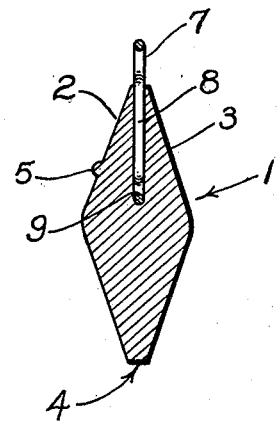
INVENTOR.
Frank J. Stevermer.
BY
Ross J.W. Woodward
ATTORNEY Patented Dec. 24, 1940

2,225,805

UNITED STATES PATENT OFFICE 2,225,805

FISHING LINE SINKER

Frank J. Stevermer, Rio Vista, Calif.

Application November 6, 1939, Serial No. 303,147

3 Claims. (Cl. 43—52)

This invention relates to a weight or sinker of the type used upon fishing lines for holding the outer end of the line at the bottom of a lake, river, or other body of water.

Sinkers as now made have objectionable features of construction since they have a tendency to catch against rockets, sunken logs, and other obstructions, and also have so much air resistance that it is difficult to make a long cast when using a sinker of the necessary weight for surf fishing.

It is, therefore, one object of the invention to provide a sinker of such formation that while it may have sufficient weight to serve its purpose, its wind resistance will be reduced to a minimum and its shape will allow it to be drawn along the bottom without becoming caught against rocks, logs and other obstructions when reeling in a fish line after making a cast.

Another object of the invention is to provide a sinker so shaped that it will be suitable for either still fishing, casting, or trolling, the sinker having sufficient weight to carry it through the air and being of such shape that it may have good anchoring engagement with the bottom but move easily along the bottom when pull is exerted upon a fishing line during trolling or when reeling in a line.

Another object of the invention is to provide the sinker with a line engaging member having a shank embedded in the body of the sinker and so formed that it will be firmly held in place and prevented from shifting longitudinally out of place or turning in the body.

Another object of the invention is to provide a sinker having improved means for indicating the weight of the sinker.

The invention is illustrated in the accompanying drawing, wherein:

Fig. 1 is a view in side elevation showing the improved sinker in use.

Fig. 2 is a view looking down on the sinker when in the position of Fig. 1.

Fig. 3 is a sectional view taken diametrically through the sinker on the line 3—3 of Fig. 2.

This improved sinker is primarily intended for use on fishing lines but it is to be understood that it is not limited to this particular use. The body 1 of the sinker is of disc-like formation and is circular in outline, as shown in Fig. 2. The body may be formed of lead or other suitable heavy metal and has opposed side faces 2 and 3, each of which is of shallow conical formation, as shown in Fig. 3. It will thus be seen that the disc or body is of gradually reduced thickness from its center toward its periphery, where it is formed with a flat but narrow peripheral edge face 4 extending entirely about the circumference of the body. All surfaces of the body are smooth in order to eliminate obstructions which might catch against rocks or the like, but the face 2 is formed with a predetermined number of small bosses or integral projections 5 which correspond in number to the number of ounces which the sinker weighs. Therefore, the small projections constitute means for indicating the weight of the sinker, but they are so arranged and of such size that they cannot catch against rocks or other obstructions and cause the sinker to be snagged. It should also be noted that, due to its shape, the sinker will offer a minimum wind resistance and can be cast through the air a relatively long distance when compared to sinkers of equal weight but of other shapes. When the sinker strikes the water it will have a tendency to skit along the surface of the water and thus gain additional distance and, when it sinks to the bottom of the water, it comes to rest on one of its conical side faces, as shown in Fig. 1, where it will serve very effectively to anchor the line 6 when still fishing but have such engagement with the bottom upon which it rests that it can be drawn along the same when casting or trolling, without danger of catching against rocks, sunken logs, or other obstructions. This is due to the fact that the front portion of the disc-like sinker will be tilted upwardly and the under face thereof will pass easily over an obstruction.

In order to secure the line to the sinker, there has been provided a line-engaging member formed from a strand of stiff wire having one end portion bent to form an eye 7 having a shank 8 extending therefrom. The shank is embedded in the disc-like body of the sinker radially thereof and, at the inner end of the shank the wire strand is bent to form a hook 9 which serves very effectively to hold the shank against longitudinal shifting movement and also prevent the shank from turning in the sinker body. This insures proper angular relation of the eye 7 to the peripheral edge face of the body and also eliminates any likelihood of the shank working loose and slipping longitudinally out of the body.

Having thus described the invention, what is claimed is:

1. A sinker of the character described comprising a disc of circular outline gradually decreasing in thickness from its center toward all points of its peripheral edge and having a flat peripheral edge face, and an attaching eye extending from the peripheral edge face of the disc and having a shank embedded in the disc radially thereof and formed with a hook at its inner end to firmly anchor the shank and prevent turning of the shank in the disc.

2. A sinker of the character described comprising a disc of circular outline gradually decreasing in thickness from its center toward its peripheral edge, and a line-engaging member having a shank embedded in the disc radially thereof and formed with an anchoring hook at its inner end and an eye at its outer end extending radially from the disc.

3. A sinker of the character described comprising a disc of circular outline gradually decreasing in thickness from its center toward its peripheral edge, and a line-engaging member extending from the peripheral edge of the disc and having a shank embedded in the disc radially thereof with its inner end bent to form an anchoring member.

FRANK J. STEVERMER.